Feb. 12, 1952 A. FRUM 2,585,002
CATHODE-RAY TUBE SWEEP SYSTEM
Filed Jan. 8, 1946 3 Sheets-Sheet 1
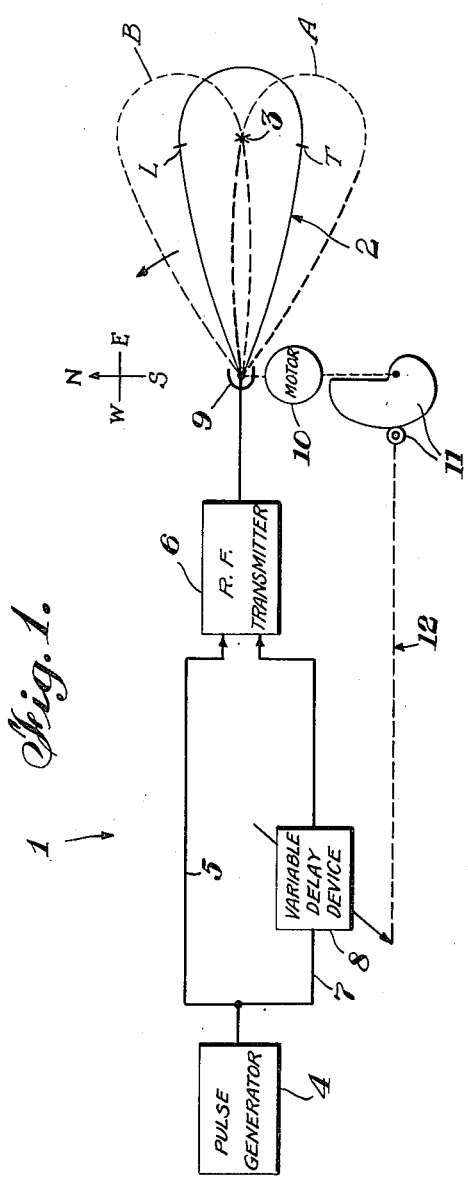
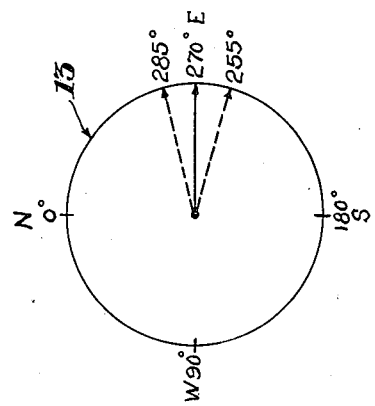
INVENTOR.
ALEXANDER FRUM
BY
*R P Morris*
ATTORNEY Feb. 12, 1952     A. FRUM     2,585,002
CATHODE-RAY TUBE SWEEP SYSTEM
Filed Jan. 8, 1946     3 Sheets-Sheet 2
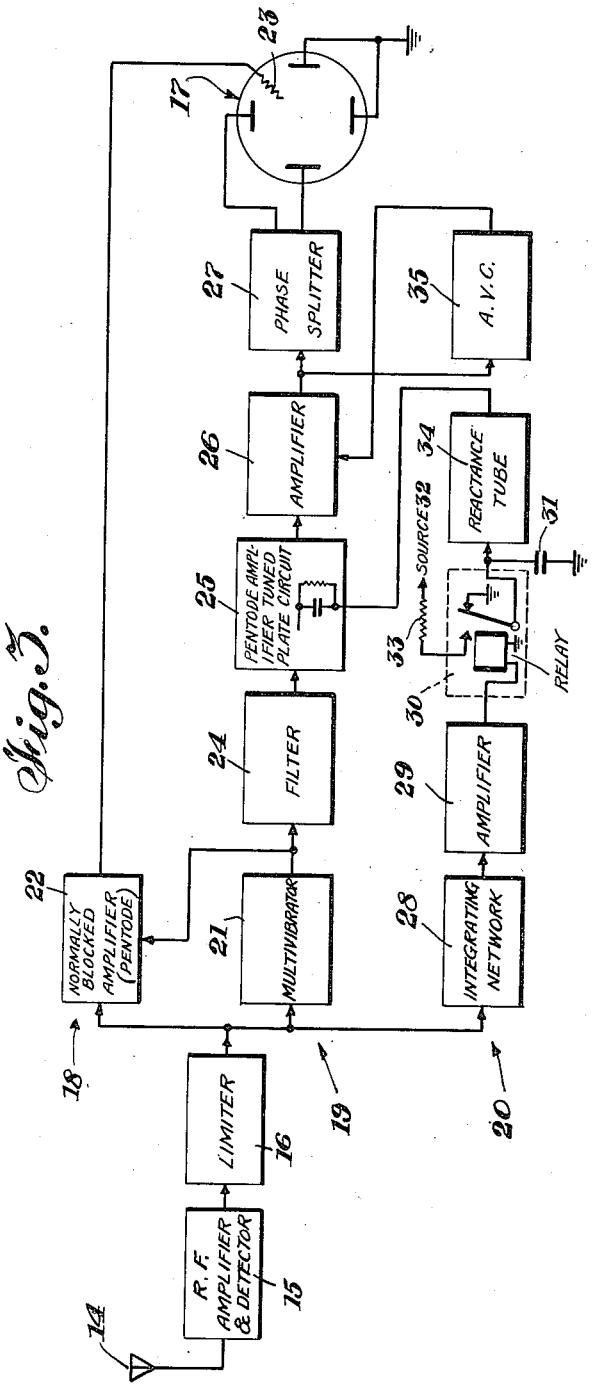
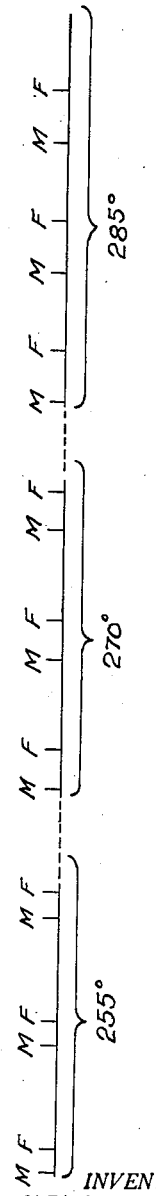
INVENTOR.
ALEXANDER FRUM
BY
*R P Morris*
ATTORNEY Feb. 12, 1952     A. FRUM     2,585,002

CATHODE-RAY TUBE SWEEP SYSTEM

Filed Jan. 8, 1946     3 Sheets-Sheet 3

*INVENTOR.*
*ALEXANDER FRUM*
BY
*R P Morris*
*ATTORNEY*

Patented Feb. 12, 1952

2,585,002

UNITED STATES PATENT OFFICE 2,585,002

CATHODE-RAY TUBE SWEEP SYSTEM

Alexander Frum, New York, N. Y., assignor to Federal Telephone and Radio Corporation, New York, N. Y., a corporation of Delaware Application January 8, 1946, Serial No. 639,844

7 Claims. (Cl. 343—106)

This invention relates to "cathode ray tube sweep systems" and particularly to such systems for use in receivers for radio beacons.

In many systems a succession of signals occur in which the individual signals have fixed time relationships to each other and to some referable phenomena such as for example, the continuous movement (i. e. the rotation) of a beam in a cathode ray tube. In certain systems it is desirable to vary the relationships of certain of these signals with respect to the phenomena without varying the relationships of others. For example the first signal may be used to initiate or synchronize the movement or rotation of the beam and will therefore bear a fixed time relationship to the rotation of the beam while it may be desired to produce a relative displacement in the time of coincidence of the subsequent signals and the instantaneous positions of the beam. This variation of the relationships of the subsequent signals with respect to the phenomena may be progressive and may be a function of the total time elapsing between the first signal and the last signal.

One application of the foregoing may be found in connection with beacon systems, particularly of the type in which a characteristic of the energy transmitted from the beacon is continuously varied as a directional beam (usually having a lobular field pattern) is rotated so that in each azimuthal direction of the beam, there is a unique characteristic of the transmitted energy which serves to identify that angle or azimuth. One of the difficulties inherent in such beacon systems is that caused by the width of the beam. Beams frequently vary in width from 20° to as much as 60°. As the beam of the beacon station rotates, the leading edge of the beam will first strike the craft, which for example, may be an aircraft which is to be guided. At this instance the beam will have certain signal characteristics indicating the azimuthal direction of the center of the beam from the beacon station. As the beam continues to rotate past the aircraft, these characteristics are varied so that by the time the trailing edge of the beam departs from the aircraft, an entirely different set of characteristics are emitted whose significance may vary from as much as 20° to 60° from the first indication. Since the indication may vary from 20° to as much as 60°, depending on the beam width, the true course becomes obscure.

An object of the present invention is the provision of an improved means for varying the time relationships between a succession of signals and a given phenomena which have given time relationships with each other.

Another object is the provision of an improved means for progressively varying, as a function of time, given relationships between a succession of signals and the sweep of a beam in a cathode ray tube.

Another object is the provision of a method and means as set forth in the preceding paragraph wherein the variation is a function of the total time elapsing between the first of the signals and the last of the signals which form a consecutive series.

Still another object of the present invention is the provision of an improved receiver for a rotary radio beacon utilizing a cathode ray tube indicator.

A still further object of the present invention is the provision of the receiver for a rotary radio beacon of the type hereinabove described, and utilizing a cathode ray tube indicator, in which the indefiniteness, due to beam width, is substantially eliminated.

Other and further objects of the present invention will become apparent and the invention will be best understood from the following description of embodiments thereof, reference being had to the drawings, in which:

Fig. 1 is a schematic diagram of a radio beacon station of the type hereinabove described;

Fig. 2 is a diagrammatic view of the screen of a cathode ray tube in a receiver for such a system;

Figure 4:
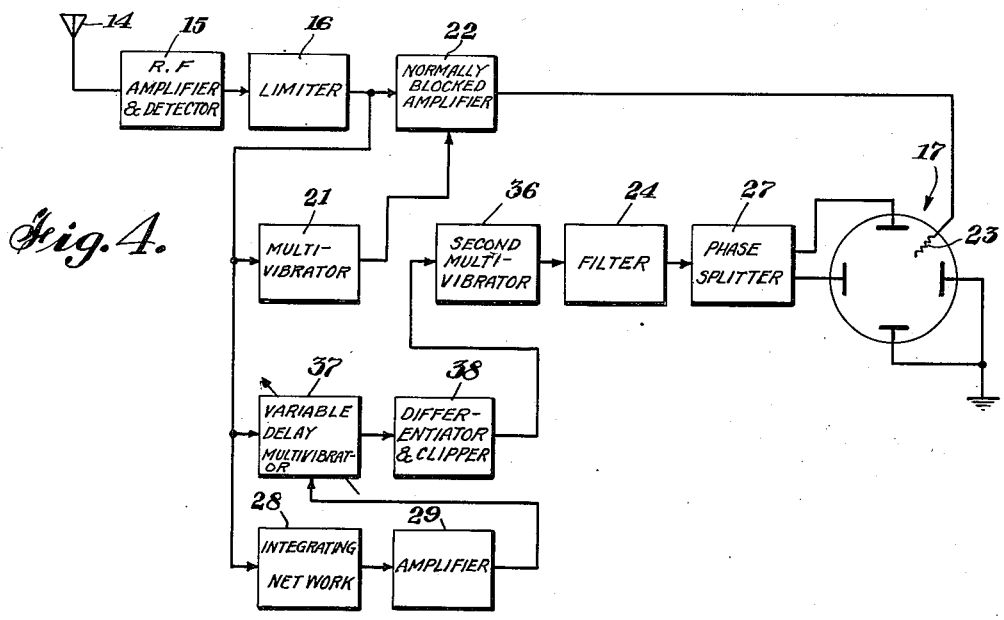
Figure 5:
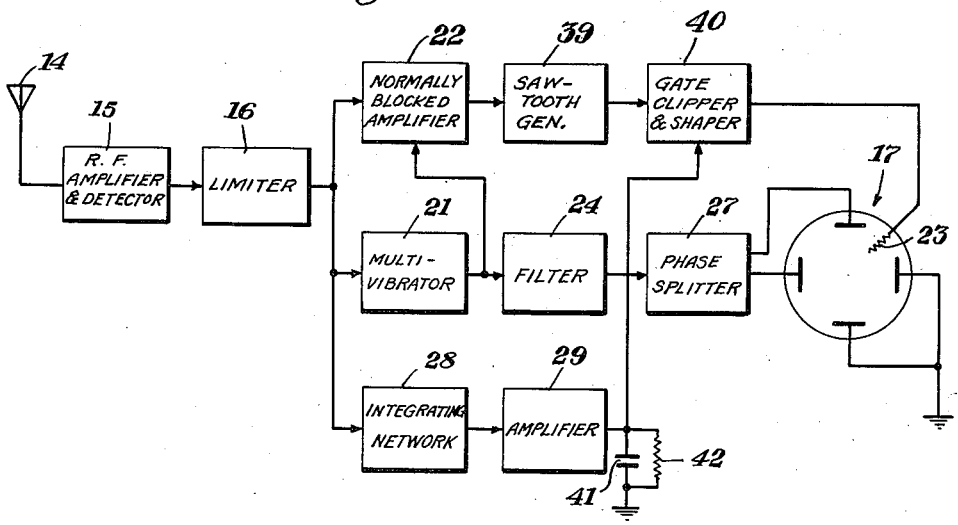

Figs. 3, 4, and 5 are schematic diagrams of receivers for such beacon stations which embody my invention, Fig. 3 being a preferred embodiment; and Fig. 6 is a representation of a wave train emitted from the beacon station of Fig. 1.

Referring now to Fig. 1, a rotary radio beacon station generally designated by the numeral 1, produces a rotating beam 2, having characteristics which vary with azimuth and are utilized to notify a plane 3 of its direction from the beacon station. The beacon 1 may be of the type transmitting pulses, in pairs, in which pairs a follower pulse is continuously varied in time with respect to a fixed marker pulse as the beam is being rotated, so that for each azimuthal angle of the beam there is a unique and corresponding interval between a marker pulse and its follower pulse. For this purpose the beacon 1 may include a pulse generator 4 whose output is carried through one channel 5 to directly modulate or control a radio frequency transmitter 6 which includes means for generating a carrier frequency, and at the same time the output of said pulse generator 4 is carried over another channel 7 through a variable delay device 8 to also modulate or control the radio frequency transmitter 6. The output of the radio frequency transmitter 6 is fed to an antenna system 9 which produces a directional beam and which antenna system 9 may be rotated at a constant rate as for example, by means of a motor 10. As the motor 10 and the beam 2 rotate, the variable delay device is continuously and progressively varied as for example, by means of an eccentric cam and cam follower arrangement 11 which is mechanically coupled, as indicated by the dotted line 12, to vary the variable delay device 8. The pulses moving through channel 5 are used as the marker pulses and the pulses passing through channel 7, which are time displaced by the variable delay device 8 with respect to said marker pulses, indicate by the amount of their delay with respect to the marker pulses, the azimuthal angle of the beam. The beam 2 may be slowly rotated counter-clockwise at a rate of, for example, one complete revolution every ten seconds.

Referring now to Fig. 2, which represents the screen 13 of the cathode ray tube, it will be noted that the screen is marked off in degrees with 0° being at the north, as is conventional; 90° being the west; 180° south and 270° east, with the other degrees interpolated in between. If the craft 3 is in the position indicated in Fig. 1, that is, due east of the beacon, then the spacing between the marker pulses and their associated follower pulses has a unique characteristic producing an indication on the screen 13 at 270°. Assuming, however, that the width of the beam at the distance of the aircraft from the beacon is equivalent to 30°, then the indication produced on the screen, if no correction is made for beam width, would cover an arc from 255° to 285° or 30°. This would be due to the fact that as the beam rotates and the leading edge first reaches the aircraft, the beam will be in position A. In this position, the beam would have a characteristic, that is a spacing between the marker and follower pulses, indicative of the azimuth of the center of the beam, or indicative of an azimuthal angle of 255°. The trace on the cathode ray oscilloscope tube would then start at 255° instead of at 270°. As the beam continues to rotate, the characteristic of the emitted signals would vary so that when the aircraft is in the middle of the beam, it would give forth a signal indicative of 270°. This continues until the beam reaches position B at which the trailing edge of the beam leaves the aircraft. The center of the beam in position B would be at an angle of 285° and the trace on the screen 13 will continue in the arc from 255° to 285°. Accordingly, it will be seen that the indication produced covers an arc of 30° instead of a narrow point and thus produces an obscure indication.

Such directive beams are usually substantially symmetrical. In accordance with a feature of the present invention, points are selected on the leading and trailing edges of the beam that have equal equi-amplitude signal value. In between these points, a progressively increasing effect is produced in accordance with a feature of this invention from the moment the equi-amplitude signal point L on the leading edge of the beam is reached until a moment when the second equi-amplitude signal point T on the trailing edge of the beam is reached. This effect becomes a measure of the width of the beam. This effect is then used to cause a relative displacement between the screen trace and the moment when the cathode ray tube beam is projected under the control of one of the follower pulses so that the trace instead of going in the given instance from 255° to 285°, has only arrived at 270° when the point T on the trailing edge of the beam passes away from the receiver. The foregoing is accomplished as follows:

Referring now to Fig. 3, the receiver there depicted, which may be arranged in the aircraft, includes an omni-directional antenna 14, feeding the usual radio frequency amplifiers and detector 15, and including a limiter 16 which may follow the detector as illustrated or which may be a part of the radio frequency stages in the radio frequency amplifier and detector 15. The limiter 16 is a threshold device which does not pass energy until the energy passes a given threshold in value, so that in the instance given, no energy would pass through the limiter 16 until the point L on the leading edge of the beam is reached and thereafter energy would be passed by the limiter 16 until the point T on the trailing edge of the beam is reached. This serves to establish two equi-amplitude signal points defining between them an angle, and half-way in this angle is the correct angle which the aircraft occupies with respect to the beacon station.

The output of the limiter 16, in the example herein given, may be represented as illustrated in Fig. 6, in which the letter M represents the marker pulses and the letter F represents the follower pulses. When point L of the beam first reaches the aircraft, the follower pulses are at a given distance from their marker pulses indicating that the center of the beam is directed at, in the given instance, 255°. As the transmitted beam rotates so that the center thereof is pointing "due east" or to 270°, the separation between the marker and follower pulses increases. Finally as the trailing edge of the beam passes the aircraft, the beam is in position B and the center of it points to an azimuth of 285° and the pulses at this point are still more widely separated. The rotation of the beam in the cathode ray tube 17, on the screen of which indications are made, is synchronized or controlled by the marker pulses M whereas the illumination of the beam, that is the turning on of the beam, is controlled by the follower pulses, as will be apparent from the subsequent description. The time displacement of a follower pulse with respect to its marker pulse therefore determines the angular position at which the trace will appear on the screen. As the time between the follower pulses and marker pulses vary as indicated in Fig. 6, it will be seen that instead of a single spot of light, an arcuate trace will be produced which will vary, if no correction were made for beam width, through an arc of 30° in the given instance. In the embodiment of Fig. 3, correction is made for the beam width by providing means for retarding the rotation of the cathode ray tube beam as a function of the total time required for the points L and T on the leading and trailing edges of the beam respectively to pass the receiver, so that the end of the trace on the screen is half-way between the beginning thereof and the position it would have reached if there had been no such retardation. The foregoing is accomplished by the following mechanism:

The output of limiter 16 is fed over three separate channels 18, 19 and 20. Only the follower pulses are transmitted over channel 18 and these are used to energize a control grid and thereby to turn on the beam. The marker pulses only are transmitted over channel 19 and these are used to control and synchronize the rotation of the beam in cathode ray tube 17. All the pulses are transmitted into channel 20 and are used to mark the time from the beginning of said pulses to the end thereof, so as ultimately to retard the trace in channel 19 as a function of the total time during which the pulses are being received and thus to indicate the half-way point between the leading and the trailing edge of the beam, that is, between points L and T thereof.

In channel 19, a multivibrator 21 is actuated by the first incoming pulse which is a marker pulse. The follower pulse does not affect the multivibrator 21 since the maximum spacing between a follower and marker pulse is less than the time required for the multivibrator 21 to go through a complete cycle of change from one electrical position to an unstable position and back again to its original position. The period required for a complete oscillation of the multivibrator 21 is, however, less than the spacing between two adjacent marker pulses and therefore the multivibrator is ready to be actuated by every marker pulse. The output of the multivibrator 21 is used to unblock a normally blocked amplifier 22 which may include a tube of the pentode type which amplifier is in channel 18, there being sufficient delay in the response of the multivibrator to the marker pulse to prevent the passage of the marker pulse through the amplifier 22. The unblocking of the amplifier 22 permits the follower pulse associated with the marker pulse which operated multivibrator 21, to reach the grid or control element 23 of the cathode ray tube 17 and turn on the beam. The output of the multivibrator 21 is also fed in channel 19 to a filter 24, which selects a harmonic of the frequency of the multivibrator 21 and feeds it in the form of a sinusoidal oscillation to a pentode amplifier 25 having a tuned plate circuit. The sinusoidal output of the pentode amplifier 25 may be fed through another amplifier 26 to a phase splitter 27, the output of which is applied to the vertical and horizontal deflecting plates of the cathode ray tube 17 to produce a rotation of the beam for each marker pulse applied to the multivibrator 21 (or more exactly producing a rotating field that will rotate the beam when the beam is turned on). In channel 20, all the pulses are fed to an integrating network 28 which integrates from pulse to pulse so that the output of the integrating network is an envelope which extends for a period of time equal to the time required for the beam to pass the aircraft from point L to T of said beam. The output of the integrating network 28 is then fed to amplifier 29, which in turn actuates a relay 30, which in turn connects a condenser 31, to a source of charging voltage 32, through a current limiting resistor 33. The charge on condenser 31 increases preferably as linearly as possible throughout the entire time that the beam is passing the aircraft and thus the charge on condenser 31 is a function of the time required for this passage.

The voltage on the condenser 31 is used to control a reactance tube 34, which in turn varies the tuning of the tuned plate circuit in the pentode amplifier 25 and thereby shifts the phase of the energy applied by phase splitter 27 to the deflecting electrodes of cathode ray tube 17. As the voltage on condenser 31 builds up, the rotation of the beam is progressively retarded. The parameters of the system are so arranged that the total retardation is sufficient to cause the end of the arcuate trace on the screen of the tube to appear in a position half-way between the beginning of the trace and the position that said end would have assumed if there had been no such retardation.

Due to the fact that the action of the reactance tube 34 and the tuned plate circuit of the pentode amplifier 25 may cause a variation in amplitude of the energy fed to amplifier 26, an automatic volume control 35 may be connected to the output of amplifier 26 and back again to said amplifier 26 to assure that the output remains constant.

While in the embodiment of Fig. 3 the rate of of rotation of the trace is gradually retarded, to compensate for the width of the beam, it will likewise be apparent that the same result can be accomplished by delaying the marker pulses which determine the initiation of the rotation of the beam. One system for doing this is illustrated in Fig. 4.

Referring now to Fig. 4 in which the same numerals as used in Fig. 3 are used to indicate parts that are similar and function similarly, the output of multivibrator 21 is not used to control the rotation of the beam. Instead, an additional multivibrator 36 is used for this purpose feeding into the filter 24, which feeds in this embodiment directly into the phase splitter 27. For delaying the marker pulses, use is made of a variable delay multivibrator 37, which is fed with the output of limiter 16 to initiate the production of a square wave, and is controlled by the output of amplifier 29, so that as long as amplifier 29 is applying an output to the multivibrator 37, it causes a corresponding delay in the trailing edge of the square wave which the multivibrator 37 produces. Thus the square wave has its leading edge controlled by the triggering of the multivibrator 37 by the marker pulse from the limiter 16 and its trailing edge determined by the integrated output of network 28. The output of the variable delay multivibrator 37 is then fed to a differentiator and clipper 38 where the oscillation is differentiated and pulses corresponding to the trailing edge of the oscillation of multivibrator 37 are passed, while those corresponding to the leading edge are suppressed. Thus a series of pulses appear at the output of the differentiator and clipper 38 which are delayed with respect to the marker pulses fed into the multivibrator 37. Therefore the rotation of the beam is delayed a fixed amount. Each time a new marker pulse comes in and is delayed, the trace is again delayed for this amount. These delays are cumulative so that in the end the trace is gradually being more and more delayed, the total delay being such that the end of the trace will appear at a position half-way between the beginning of the trace and the position the end would have appeared as if there had been no delay.

While in the embodiment of Fig. 4 the delay in the marker pulse is produced by a delaying multivibrator 37, it will be apparent that this delay may also be brought about by various other means such as for example, the use of a sawtooth generator whose operation is initiated by a marker pulse and is thereafter clipped at a level determined by the output of amplifier 29, the delay increasing with time .

While in the embodiments hereinbefore described, the marker pulse is progressively delayed with respect to the follower pulse, it will be apparent that the same correction for beam width may be produced by effectively advancing the follower pulse toward the marker pulse while the later remains stationary. In the embodiment of Fig. 5, this is accomplished by delaying the follower pulse for a period at first equal to the time between two successive marker pulses (a period of 360°), and then gradually lessening the delay as the beam sweeps past the receiver, to thereby effectively advance the follower pulses with respect to the marker pulses and thus correct for beam width indefiniteness.

As shown in the embodiment of Fig. 5, the delay means may consist of a saw-tooth generator 39 and a gate clipper and shaper 40, these being inserted in series in the same channel as the normally blocked amplifier 22 through which the follower pulses pass. Each of the follower pulses from amplifier 22 trigger the saw-tooth generator 39 to produce a saw-tooth output. In gate clipper and shaper 40, the saw-tooth is clipped at two levels spaced a fixed distance apart but which two levels may be shifted together by voltages applied thereto from a condenser 41, which condenser 41 is charged by amplifier 29 during the period in which the beam is passing over the receiver. Initially before condenser 41 receives any substantial charge, the gate clipper clips at a relatively low level to produce a relatively wide rectilinear pulse. As the condenser 41 becomes charged applying a negative bias to the gate clipper and raising the two levels between which the gate clipper operates, the resultant rectilinear output pulses of the gate clipper become gradually narrower. These rectilinear pulses are differentiated in the shaper portion of device 40 so as to produce two sharp pulses, one at the leading edge and one at the trailing edge of the rectilinear pulses. The leading edge pulses are suppressed in the shaper while the trailing edge pulses are fed as output to the grid 23 of tube 17. It will be seen that the wider the rectilinear pulses, the greater the delay of the trailing edge pulse with respect to the follower pulse applied to sawtooth generator 39. In the system of Fig. 5, the trailing edge pulse is initially delayed 360° and thereafter delayed a lesser amount with respect to its follower pulse. Thus, what is effectually accomplished is the advance of the follower pulses or its effects (the trailing edge pulse) with respect to the marker pulse.

Resistor 42 is arranged across condenser 41 to permit it to discharge in the interval between the time the beam departs from the receiver to the time it returns.

The pulse delay system herein briefly described is more fully described in the copending application of E. Labin-D. D. Grieg, Serial No. 455,898, filed August 24, 1942, Patent No. 2,434,936, granted January 27, 1948.

While in the arrangement hereinbefore described, the marker and follower pulses are closest at the north and gradually go farther and farther apart as the beam sweeps through the various azimuthal angles, it is also possible to have the wider separation of the marker and follower pulses at the north, or zero degrees, and have the pulses come closer to each other as the beam sweeps through greater and greater azimuthal angles. In such case, the follower pulses would have to be retarded with respect to the marker pulses for the correction of beam width as described hereinbefore, or the marker pulses could be effectively advanced, as for example, in the manner described in connection with Fig. 5 with respect to the follower pulses.

While I have described above the principles of my invention in connection with specific apparatus, and particular modifications thereof, it is to be clearly understood that this description is made only by way of example and not as a limitation on the scope of my invention.

I claim:

1. In a cathode ray tube sweep system, means for supplying a plurality of successive signals having a given time relation to each other, a cathode ray tube, means for separating one of said signals from the other of said signals, means responsive to said separated one of said signals for producing a sweep of the beam in said tube in fixed time relation to said one signal, and means for producing a retardation of the separated signal for a length of time which is a function of the total time elapsing between the beginning of the first of said signals and the end of the last of said signals to produce a corresponding retardation of said sweep.

2. In a receiver for a radio beacon system of the type wherein signals are emitted in the form of a directional beam having substantially the field pattern of a symmetrical lobe which is angularly shiftable and in which given characteristics of the signals are continuously and progressively varied as the lobe is angularly shifted; means for receiving signals as the lobe shifts angularly past the receiver, means passing only such signals as have at least a given amplitude, a cathode ray tube, means responsive to the passed signals for producing an indication in said tube at an initial position determined by the characteristics of the first passed signal on the leading edge of the lobe, and thereafter moving in position as a direct function of the variation of the signal characteristics of the succeeding passed signals, and means rendered operative by said first signal and maintained in operation by said succeeding signals for retarding the sweep of the beam in said tube to retard the shifting in position of the indication as the signal characteristics of the succeeding passed signals vary.

3. In a receiver for a radio beacon system of the type wherein signals are emitted in the form of a directional beam having substantially the shape of a symmetrical lobe which is angularly shiftable and in which given characteristics of the signals are continuously and progressively varied as the lobe is angularly shifted; means for receiving signals as the lobe shifts angularly past the receiver, means passing only such of said signals that have at least a given amplitude, a cathode ray tube, means responsive to the passed signals for producing a trace on the screen of said tube that moves at an angular rate equal to the rate of rotation of said directional beam, and means controlled by the duration of the passed signals for retarding said trace so that it shifts through an angle equal to half the angle through which the directional beam shifts during an equivalent period.

4. In a receiver for a radio beacon system wherein signals in the form of pairs of pulses are emitted with a field pattern having substantially the shape of a symmetrical lobe which is angularly shiftable, and in which the spacing between the pulses of each pair is continuously and progressively varied as the lobe is shifted; means for receiving said pulses as the lobe shifts angularly past the receiver, means passing only such pulses as have at least a given amplitude, a cathode ray tube, means responsive to the first pulse of each pair for producing a sweep of the beam in said cathode ray tube, means responsive to the second pulse of each pair for turning on the beam, and means rendered operative by the first passed pulse as the lobe sweeps past the receiver, and maintained in operation by the succeeding passed pulses as the lobe continues to sweep past the receiver, for continually retarding the sweep of the beam in said tube.

5. A receiver according to claim 4 wherein the retarding means includes means for delaying the first passed pulse of each pair to thereby delay the sweep of the beam.

6. In a receiver for a radio beacon system wherein signals in the forms of pairs of pulses are emitted with the field pattern having substantially the shape of a symmetrical lobe which is angularly shiftable, and in which the spacing between the pulses of each pair is continuously and progressively varied as the lobe is shifted, means for receiving said pulses as the lobe moves angularly past the receiver, means passing only such pulses as having at least a given amplitude, a cathode ray tube, means responsive to the first passed pulse of each pair of pulses for producing a sweep of the beam in said cathode ray tube, means responsive to the second of the passed pulses of each pair for turning on the beam, and timing means responsive to the first passed pulse as the lobe sweeps past the receiver and maintained in operation by the succeeding passed pulses as the lobe continues to sweep past the receiver for continuously and progressively retarding the sweep of the beam in said tube whereby the trace on the screen of said tube moves through an angle equal to half the angle through which the lobe shifts between the first and last passed pulses in the receiver.

7. A receiver according to claim 6 wherein said retarding means includes means for retarding the first pulse of each pair of pulses to thereby retard the sweep of the beam in the tube.

ALEXANDER FRUM.

REFERENCES CITED

The following references are of record in the file of this patent:

UNITED STATES PATENTS

| Number | Name | Date |
|---|---|---|
| 2,184,843 | Kramar | Dec. 26, 1939 |
| 2,215,197 | Sherman | Sept. 17, 1940 |
| 2,313,048 | Byrne | Mar. 9, 1943 |
| 2,328,476 | Luck | Aug. 31, 1943 |
| 2,402,410 | Kear | June 18, 1946 |
| 2,405,203 | Goldstein | Aug. 6, 1946 |
| 2,415,870 | De Ryder | Feb. 18, 1947 |
| 2,421,747 | Engelhardt | June 10, 1947 |
| 2,434,264 | Edson | Jan. 13, 1948 |
| 2,440,263 | Grieg | Apr. 27, 1948 |
| 2,449,848 | Hefele | Sept. 21, 1948 |
| 2,449,982 | De Rosa | Sept. 28, 1948 |
| 2,450,005 | Labin et al. | Sept. 28, 1948 |
| 2,453,711 | Isbister et al. | Nov. 16, 1948 |
| 2,492,700 | Jeanne | Dec. 27, 1949 |